United States Patent
Zeng et al.

(10) Patent No.: US 9,489,014 B2
(45) Date of Patent: Nov. 8, 2016

(54) FOLDABLE DISPLAY DEVICE

(71) Applicant: TRONXYZ TECHNOLOGY CO., LTD., Shenzhen (CN)

(72) Inventors: Zhirong Zeng, Shenzhen (CN); Shuibo Tong, Shenzhen (CN); Eric Poon, Shenzhen (CN); Jinshi Lai, Shenzhen (CN); Qi Ban, Shenzhen (CN)

(73) Assignee: TRONXYZ TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/795,865

(22) Filed: Jul. 9, 2015

(65) Prior Publication Data

US 2016/0187923 A1    Jun. 30, 2016

(30) Foreign Application Priority Data

Dec. 30, 2014  (CN) ............... 2014 2 0870195 U

(51) Int. Cl.
*G06F 1/16*        (2006.01)

(52) U.S. Cl.
CPC ............ *G06F 1/1616* (2013.01); *G06F 1/166* (2013.01); *G06F 1/1615* (2013.01); *G06F 1/1679* (2013.01)

(58) Field of Classification Search
CPC .. G06F 1/1615; G06F 1/1616; G06F 1/1679; G06F 1/166; G02F 2001/133626
USPC ............. 361/679.01–679.45, 679.55–679.59
See application file for complete search history.

(56) References Cited

U.S. PATENT DOCUMENTS

| | | | | |
|---|---|---|---|---|
| 5,970,418 A * | 10/1999 | Budd | ............... | G02B 27/022 379/93.17 |
| 6,104,447 A * | 8/2000 | Faris | ............... | G02B 6/0051 348/E13.007 |
| 6,481,851 B1 * | 11/2002 | McNelley | ......... | G02B 27/2292 345/5 |
| 2004/0136155 A1 * | 7/2004 | Onishi | ............ | G02F 1/133615 361/679.24 |
| 2009/0059102 A1 * | 3/2009 | Chien | ................. | G02F 1/1336 349/5 |
| 2012/0275131 A1 * | 11/2012 | Huang | ................. | G06F 1/166 361/810 |
| 2015/0268477 A1 * | 9/2015 | Ge | ....................... | H04N 13/00 349/15 |
| 2015/0268508 A1 * | 9/2015 | Ge | ................. | G02F 1/133308 345/633 |
| 2015/0268748 A1 * | 9/2015 | Ge | ................... | H04N 13/0468 345/173 |
| 2015/0269880 A1 * | 9/2015 | Ge | ..................... | G09G 3/2003 345/690 |
| 2015/0271477 A1 * | 9/2015 | Ge | ................... | H04N 13/0443 348/51 |

\* cited by examiner

*Primary Examiner* — Nidhi Thaker

(74) *Attorney, Agent, or Firm* — Anova Law Group, PLLC

(57) ABSTRACT

A foldable display device is provided. The device includes a top cover body and a transflective assembly rotatably connected to the top cover body. The device also includes a bottom cover body rotatably connected to the transflective assembly. Further, the device includes a viewing angle adjustment mechanism set on the bottom cover body and configured to expand and collapse with respect to the bottom cover body, wherein the top cover body, the transflective assembly, and the bottom cover body are configured to expand spatially to form a viewing angle when the foldable display device is in an open state, and the viewing angle adjustment mechanism is configured to expand with respect to the bottom cover body to adjust the viewing angle when the foldable display device is in a viewing angle adjustable state and to support the foldable display device when the foldable display device is in the open state.

15 Claims, 7 Drawing Sheets

FOLDABLE DISPLAY DEVICE

CROSS-REFERENCES TO RELATED APPLICATIONS

This application claims priority of Chinese Application No. 201420870195.0, filed on Dec. 30, 2014, the entire contents of which are hereby incorporated by reference.

FIELD OF THE INVENTION

The present disclosure generally relates to the field of electronic device technologies and, more particularly, relates to foldable display devices.

BACKGROUND

There are a large number of foldable electronic devices in existing technologies. When a user opens a foldable electronic device (e.g., a laptop), the commonly used method is to manually open a cover structure of the foldable electronic device. For example, the laptop's display screen is upturned with respect to the laptop's main body (i.e., a body with a keyboard), such that the laptop's display screen is rotated to a desired viewing angle. When the user needs to change the viewing angle, the user can adjust the viewing angle by adjusting the rotation angle of the display screen again.

However, for the foldable display device, because limitations of structure design of the foldable display device and the requirements for scene selection during an imaging process, a rotation angle adjustment cannot be made for the display screen of the foldable display device. Thus, an angle adjustment mechanism needs to be provided to achieve a viewing angle adjustment for the foldable display device. Further, in the existing technologies, the operations for opening the electronic devices are more cumbersome. Also, the top cover of the electronic device needs to be manually opened, and cannot be opened in one step. The process is laborious and time-consuming, thus impacting user experience.

The disclosed foldable display devices are directed to solve one or more problems set forth above and other problems.

BRIEF SUMMARY OF THE DISCLOSURE

One aspect of the present disclosure includes a foldable display device. The device includes a top cover body and a transflective assembly rotatably connected to the top cover body. The device also includes a bottom cover body rotatably connected to the transflective assembly. Further, the device includes a viewing angle adjustment mechanism set on the bottom cover body and configured to expand and collapse with respect to the bottom cover body, wherein the top cover body, the transflective assembly, and the bottom cover body are configured to expand spatially to form a viewing angle when the foldable display device is in an open state, and the viewing angle adjustment mechanism is configured to expand with respect to the bottom cover body to adjust the viewing angle when the foldable display device is in a viewing angle adjustable state and to support the foldable display device when the foldable display device is in the open state.

Another aspect of the present disclosure includes a foldable display device. The device includes a bottom cover body. The device also includes a transflective assembly rotatably connected to the bottom cover body. Further, the device includes a viewing angle adjustment mechanism set on the bottom cover body and configured to expand and collapse with respect to the bottom cover body, wherein the transflective assembly and the bottom cover body are configured to expand spatially to form a viewing angle when the foldable display device is in an open state, and the viewing angle adjustment mechanism is configured to expand with respect to the bottom cover body to adjust the viewing angle when the foldable display device is in a viewing angle adjustable state and to support the foldable display device when the foldable display device is in the open state.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
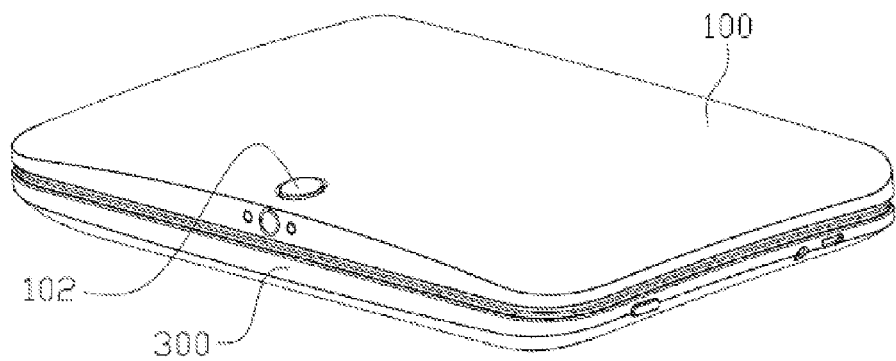
FIG. 1 illustrates a schematic diagram of an exemplary foldable display device in a closed state consistent with the disclosed embodiments.
Figure 2:
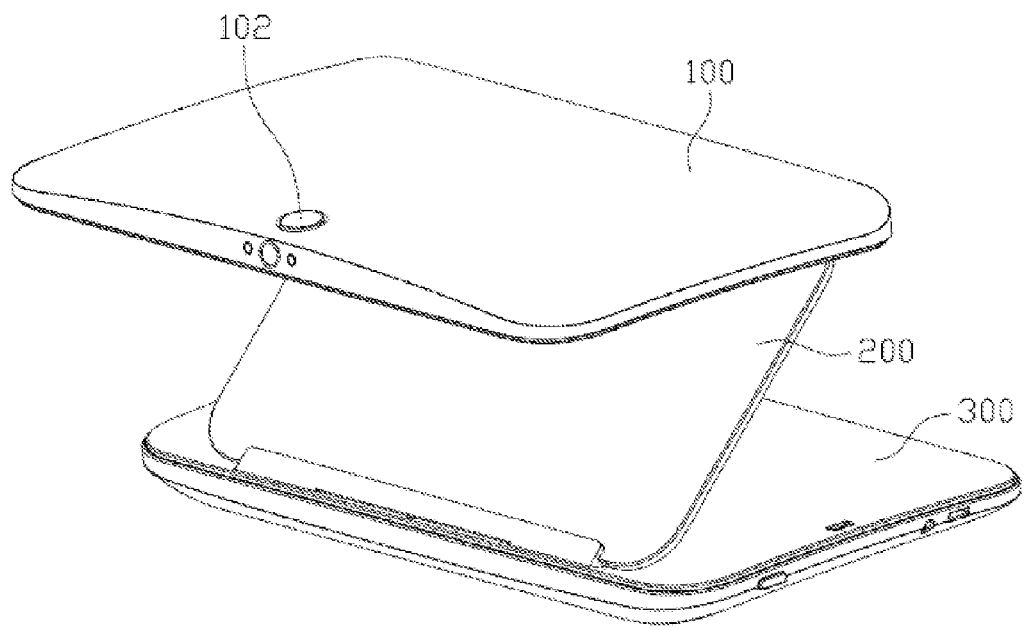
FIG. 2 illustrates a schematic diagram of an exemplary foldable display device in an open state consistent with the disclosed embodiments.
Figure 3:
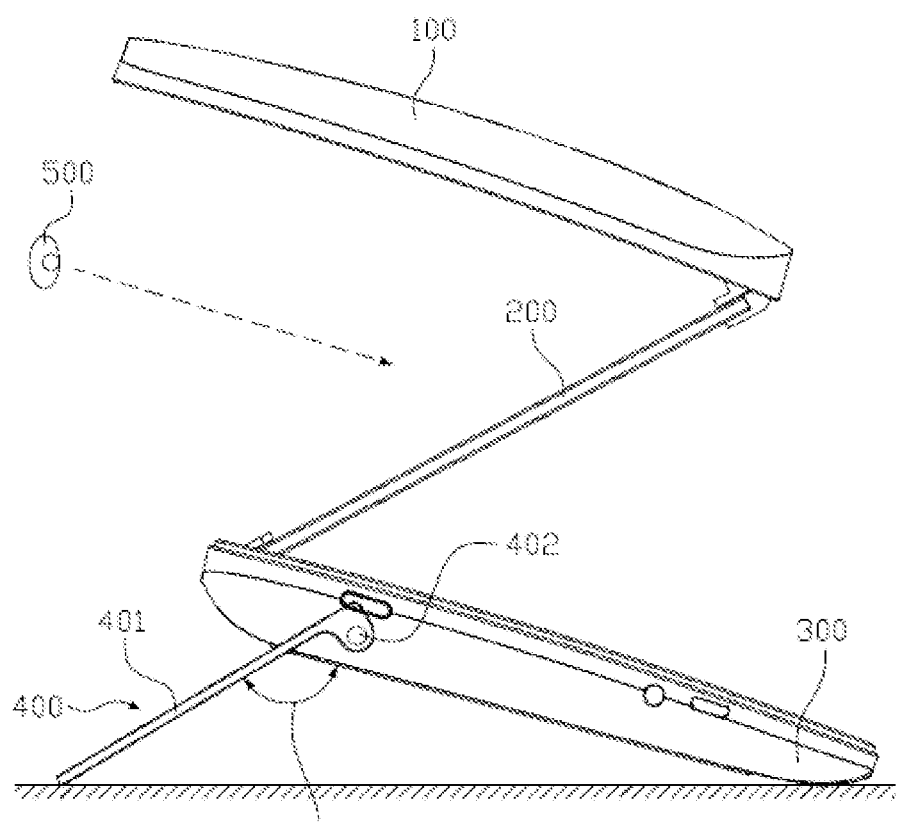
FIG. 3 illustrates a schematic diagram of an exemplary foldable to display device in a viewing angle adjustable state consistent with the disclosed embodiments.

FIG. 1 illustrates a schematic diagram of an exemplary foldable display device in a closed state consistent with the disclosed embodiments. FIG. 2 illustrates a schematic diagram of an exemplary foldable display device in an open state consistent with the disclosed embodiments. FIG. 3 illustrates a schematic diagram of an exemplary foldable display device in a viewing angle adjustable state consistent with the disclosed embodiments. As shown in FIG. 1 to FIG. 3, the foldable display device may include a top cover body (or a top cover) 100, a transflective assembly 200, a bottom cover body (or a bottom cover) 300, and a viewing angle adjustment mechanism 400.

The foldable display device may include three states: a closed state as shown in FIG. 1, an open state as shown in FIG. 2, and a viewing angle adjustable state as shown in FIG. 3. When the foldable display device is in the closed state, the appearance of the foldable display device is a flat box shape. When the foldable display device is in the open state, the top cover body 100, the transflective assembly 200 and the bottom cover body 300 are opened to form a Z-shape (i.e., the shape of the letter Z). When the foldable display device is in the viewing angle adjustable state, the viewing angle adjustment mechanism 400 is unfolded to support the foldable display device in the open state, thus adjusting the viewing angle.

The transflective assembly 200 is connected respectively to the top cover body 100 and the bottom cover body 300 through a movable connection mechanism, thus realizing a foldable effect. The viewing angle adjustment mechanism 400 is installed on the bottom cover body 300 and can expand or collapse with respect to the bottom cover body 300. The viewing angle adjustment mechanism 400 can adjust the viewing angle of the user who views the foldable display device, thus achieving a desired viewing effect.

As shown in FIG. 3, the viewing angle adjustment mechanism 400 is installed on the bottom of the bottom cover body 300. The viewing angle adjustment mechanism 400 may include a bracket 401 and a rotating shaft 402. The bracket 401 is rotatably connected to the bottom cover body 300 through the rotating shaft 402, such that the bracket 401 can be rotated with respect to the bottom cover body 300 by using the rotating shaft 402 as an axis. When it is needed, several levels of fixed angle adjustments or any angle adjustment can be achieved. When the rotating shaft 402 performs the angle adjustment using different stalls, several levels of fixed angle adjustments can be achieved. When the rotating shaft 402 is a damping shaft, any angle adjustment of the viewing angle can be achieved.

When the angle adjustment is not performed or the viewing angle does not need to be adjusted, the bracket 401 is attached to the bottom of the bottom cover body 300. For example, a mounting groove (not shown in FIG. 3) is set at the bottom of the bottom cover body 300. When the bracket 401 is collapsed, the bracket 401 is placed inside the mounting groove. When the user adjusts the viewing angle, the user can obtain a desired viewing experience through adjusting an open angle 403 of the bracket 401.

In one embodiment, when the viewing angle is adjusted, the expanding direction is descried in the followings. The bracket 401 is rotated in a clockwise direction by using one end of the bracket 401 which is connected to the bottom cover body 300 as a fixed end and using the other end of the bracket 401 as an oscillating end. That is, the bracket 401 is opened from the rear of the bottom cover body 300, and the bracket 401 is rotated toward to the front portion of the bottom cover body 300 using the rotating shaft 402 as the axis, such that the foldable display device and a support platform form a relatively stable triangular relationship, thus realizing the viewing angle adjustment. It should be understood that, to ensure the stability of the foldable display device during the viewing angle adjusting process, it usually requires that an angle between the bracket 401 and the support platform is greater than 90 degrees, as shown in FIG. 3.

When the user does not use the foldable display device or does not need to adjust the viewing angle, the user can collapse the bracket 401 and place it at the bottom of the bottom cover body 300 along a direction opposite to the expanding direction. The operation is easy to perform, and the external appearance of the foldable display device is not affected.

The structure of the foldable display device using the viewing angle adjustment mechanism 400 is simple. The imaging space and the appearance of the foldable display device are not affected. When the user views the image using the foldable display device, if the viewing angle needs to be adjusted, the user only needs to open the viewing angle adjustment mechanism 400; if the user does not use the foldable display device, the user collapses the viewing angle adjustment mechanism 400. It is convenient for the user to adjust the viewing angle, such that a desired viewing effect is achieved.

Figure 4:
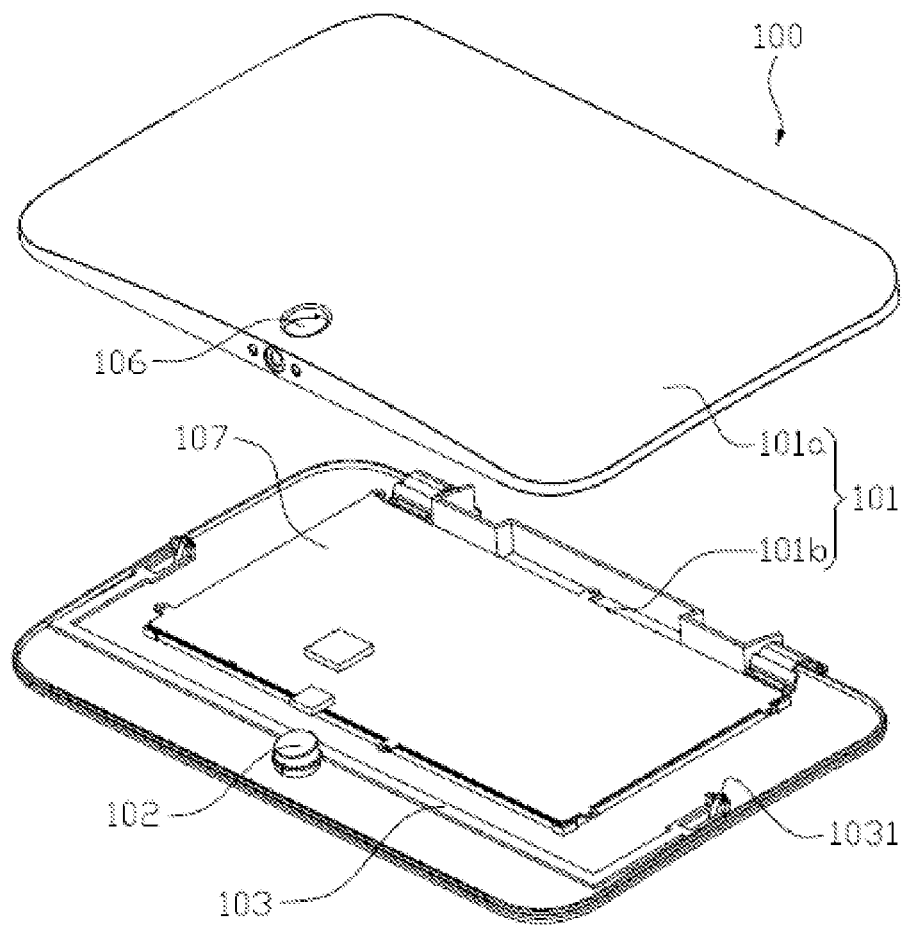
FIG. 4 illustrates a structure schematic diagram of an exemplary top cover body of a foldable display device consistent with the disclosed embodiments.

FIG. 4 illustrates a structure schematic diagram of an exemplary top cover body of a foldable display device consistent with the disclosed embodiments. As shown in FIG. 4, the top cover body 100 may include a top case 101, an unlock switch 102, and a lock catch 103. The unlock switch 102 and the lock catch 103 are set inside the top case 101. The unlock switch 102 may be configured to drive the lock catch 103 to unlock the top case 101.

The unlock switch 102 is a push-button switch. The push-button switch is set on the top case 101. When the push-button is pushed, the lock catch 103 is driven to move, thus unlocking the lock catch 103.

In one embodiment, the top case 101 includes a top cover 101a and a bottom cover 101b. The unlock switch 102 and the lock catch 103 are set on the bottom cover 101b. The top cover 101a and the bottom cover 101b are connected together to form the top cover body 101. An opening 106 through which the unlock switch 102 can pass is set at a position corresponding to the unlock switch 102 on the top cover 101a, such that the unlock switch 102 can pass through the top cover 101a and come out. Therefore, the user can press down the unlock switch 102 to open the foldable display device. One-key may start the foldable display device.

Figure 5:
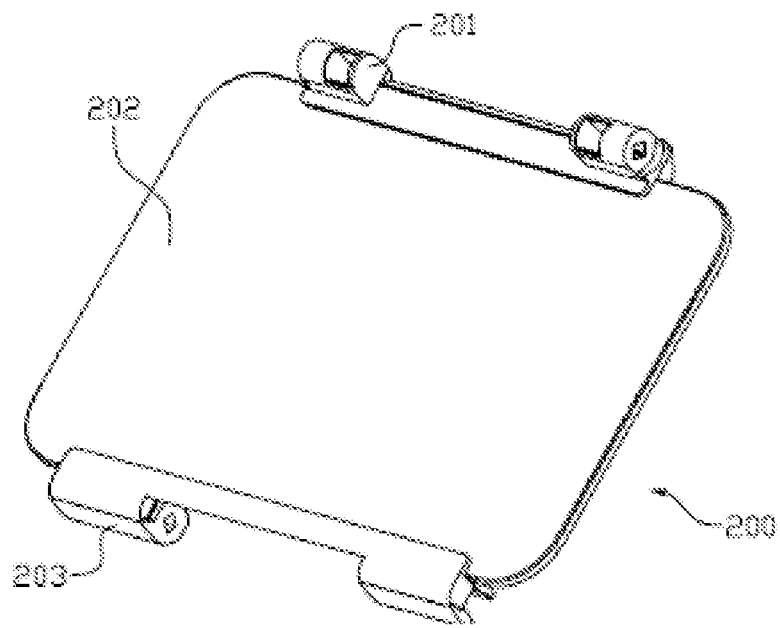
FIG. 5 illustrates a structure schematic diagram of an exemplary transflective assembly of a foldable display device consistent with the disclosed embodiments.

FIG. 5 illustrates a structure schematic diagram of an exemplary transflective assembly of a foldable display device consistent with the disclosed embodiments. As shown in FIG. 5, the transflective assembly 200 may include an upper torsion spring shaft 201, a transflective board 202, and a lower torsion spring shaft 203. The transflective board is used as an optical combiner that reflects stereoscopic 3D graphics off an arbitrary surface. The upper torsion spring shaft 201 and the lower torsion spring shaft 203 are set respectively at the upper side and the lower side of the transflective board 202. The upper torsion spring shaft 201 is connected to the top cover body 100, and the lower torsion spring shaft 203 is connected to the bottom cover body 300.

The upper torsion spring shaft 201 and the lower torsion spring shaft 203 include torsion springs (not shown in FIG. 5), respectively. An elastic torque can be provided through the torsion springs, such that the top cover body 100 and the transflective assembly 200 can automatically pops up when the foldable display device is unlocked. That is, the transflective assembly 200 is connected respectively to the top cover body 100 and the bottom cover body 300 through a moveable connection structure.

When the unlock switch 102 is pressed, the lock catch 103 and the bolt 303 are unlocked, such that the foldable display device automatically pops up under the action of the movable connection structure. It should be understood that, in addition to the upper torsion spring shaft 201 and the lower torsion spring shaft 203, the movable connection structure may use other technical solutions to realize an automatic popup function, details of which are well known to those skilled in the art and are not repeated herein.

Figure 6:
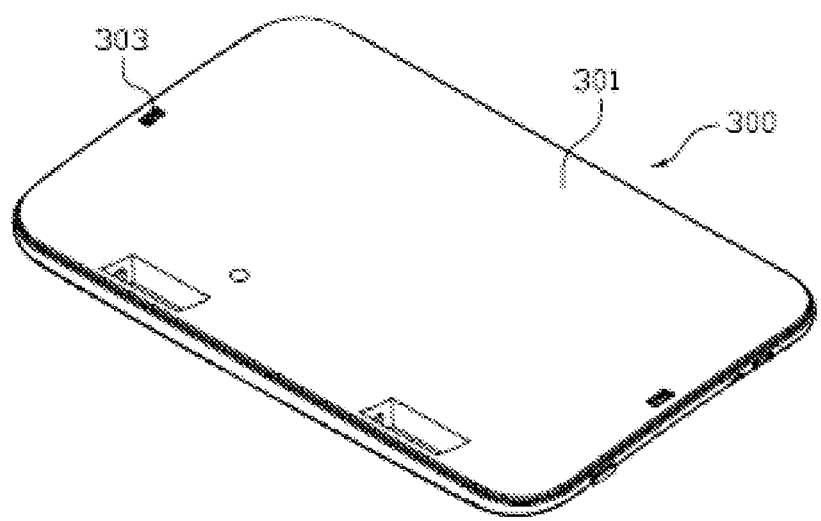
FIG. 6 illustrates a structure schematic diagram of an exemplary bottom cover body of a foldable display device consistent with the disclosed embodiments.

FIG. 6 illustrates a structure schematic diagram of an exemplary bottom cover body of a foldable display device consistent with the disclosed embodiments. As shown in FIG. 6, the bottom cover body 300 may include a bottom case 301 and a bolt 303. The latch is set inside the bottom case 301 and the position of the latch is fixed. The bolt 303 may be configured to form a locking relationship with the lock catch 103. The number of the bolt 303 may be two. The two bolts 303 are set respectively at two corresponding sides of the bottom case 301. Therefore, the foldable display device can be locked from two sides, and the locking is more stable.

In one embodiment, the assembly relationship among the top cover body 100, the transflective assembly 200 and the bottom cover body 300 are described in the followings. The top cover body 100 and the bottom cover body 300 are connected through the transflective assembly 200. That is, the top cover body 100 is rotatably connected to the transflective assembly 200 through the upper torsion spring shaft 201. The transflective assembly 200 is rotatably connected to the bottom cover body 300 through the lower torsion spring shaft 203. The top cover body 100 and the bottom cover body 300 are connected together through the transflective assembly 200, thus achieving a Z-shaped open state. As shown in FIG. 2, the top cover body 100 parallels to the bottom cover body 300, and the transflective assembly 200 tilts at a 45 degree angle. Therefore, the transflective assembly 200 and the top cover body 100 form a 45 degree angle, and the transflective assembly 200 and the bottom cover body 300 also form a 45 degree angle. Other degrees of angles can also be used.

Figure 7:
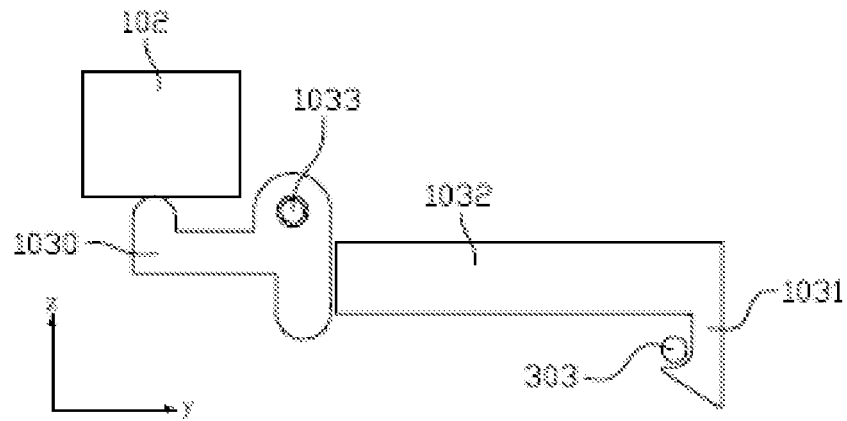
FIG. 7 illustrates a structure schematic diagram of a lock catch and a bolt in a lock state consistent with the disclosed embodiments.
Figure 8:
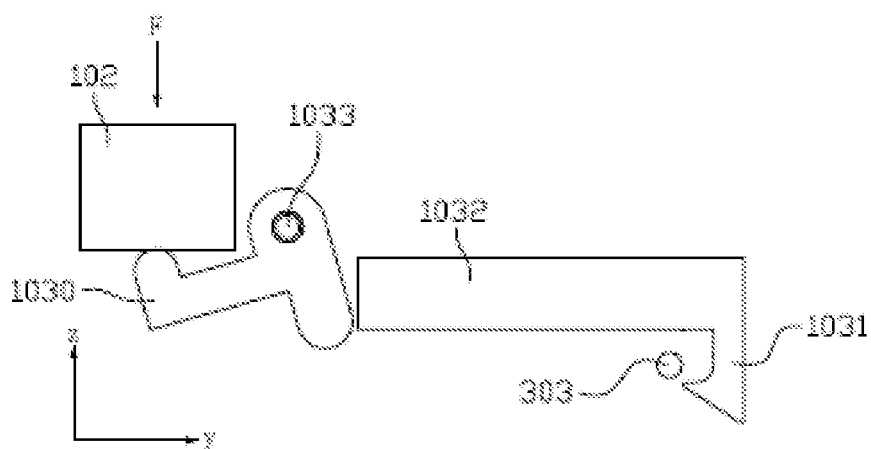
FIG. 8 illustrates a structure schematic diagram of a lock catch and a bolt in an unlock state consistent with the disclosed embodiments.

FIG. 7 illustrates a structure schematic diagram of a lock catch and a bolt in a lock state consistent with the disclosed embodiments. FIG. 8 illustrates a structure schematic diagram of a lock catch and a bolt in an unlock state consistent with the disclosed embodiments. In the following, in combination with FIG. 7 and FIG. 8, the operation principle of the one-key starting the foldable display device is described in details.

As shown in FIG. 7 and FIG. 8, the lock catch may include a pressing lever 1030, a pressing lever shaft 1033, an unlock connecting rod 1032, and a latch hook 1031. The unlock switch 102 abuts the pressing lever 1030. The position of the pressing lever shaft 1033 is fixed. The pressing lever 1030 is installed on the pressing lever shaft 1033, and the pressing lever 1030 is rotated using the pressing lever shaft 1033 as an axis. The pressing lever 1030 abuts the unlock connecting rod 1032. The latch hook 1031 is formed on the unlock connecting rod 1032. The latch hook 1031 may be configured to lock with the bolt 303.

Due to the restriction of the top cover body 100, the unlock connecting rod 1032 can only move horizontally in a 'y' direction. Due to the restriction of the top cover body 100, the unlock switch 102 can only move in a 'z' direction. When the user presses the unlock switch 102, the unlock switch 102 moves down in the 'z' direction, thus pushing the pressing lever 1030 to rotate by using the pressing lever shaft 1033 as the axis. When the pressing lever 1030 is rotated, the unlock connecting rod 1032 is also driven to move horizontally in the 'y' direction. At this time, the positions of the latch hook 1031 and the bolt 303 are staggered (as shown in FIG. 8), such that the top cover body 100 and the bottom cover body 300 are unlocked.

When the top cover body 100 and the bottom cover body 300 are unlocked, the lower torsion spring shaft 203 is connected to the bottom cover body 300, using a connecting point as an axis, drives the transflective assembly 200 to automatically pop up and upturn until the angle between the transflective assembly 200 and the bottom cover body 300 is approximately 45 degrees. At the same time, the upper torsion spring shaft 201 connected to the top cover body 100 drives the top cover body 100 to pop up and upturn until the angle between the transflective assembly 200 and the top cover body 100 is approximately 45 degrees by using the connecting point as the axis. Therefore, the foldable display device is opened up and the top cover body 100, the transflective assembly 200, and the bottom cover body 300 form a Z-shape.

In one embodiment, the lock catch 103 and the bolt 303 are locked, the foldable display device is in a closed state as a box (as shown in FIG. 1). When the unlock switch 102 is pressed, the lock catch 103 and the bolt 303 are unlocked. Under the action of the upper torsion spring shaft 201 and the lower torsion spring shaft 203, the foldable display device automatically pops up and appears to be a Z-shaped open state (as shown in FIG. 2). Therefore, when the foldable display device is opened, the operation is easy to perform and there is no need to unfold and open the foldable display device manually. Only one-button opening operation needs to be performed, the foldable display device can automatically pop up.

Also, the open process is one step and the operation is easy to perform, thus improving the user experience. Because the foldable display device automatically pops up and the operation is one step, when the viewing angle needs to be adjusted, the viewing angle adjustment mechanism 400 can be used. The structure of the viewing angle adjustment mechanism 400 is simple and the adjusting operation is also easy to perform. Therefore, it is convenient for the user to adjust the viewing angle and achieve the desired viewing effect.

The foldable display device may receive image data from an external terminal through a wired or a wireless mode and display the image data. Further, the foldable display device may also include a display screen 107. The display screen 107 may be set on the top cover body 100 or the bottom cover body 300. In one embodiment, the display screen 107 is set on the top cover body 100. The display screen 107 may be configured to display the image data received by the foldable display device. Also, the image data displayed by the display screen 107, under the transmission and reflection of the transflective assembly 200, can form an image in the space for the user to view.

Figure 9:
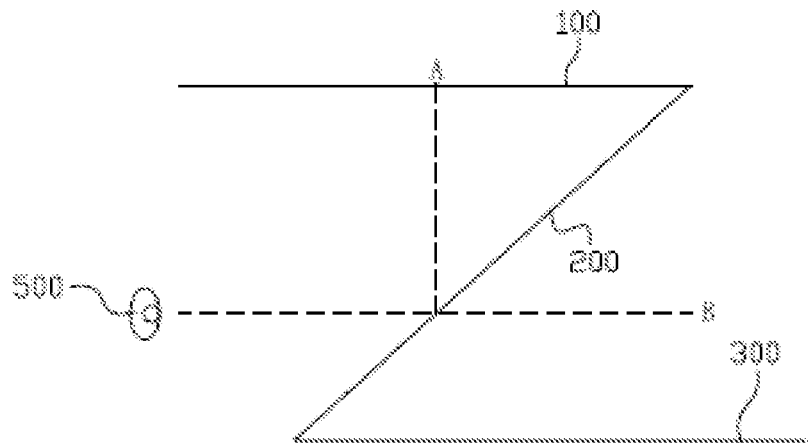
FIG. 9 illustrates a schematic diagram of image-forming principle of an foldable display device consistent with the disclosed embodiments.

The transflective assembly 200 is a transparent assembly having a transmission and reflection function. The transflective assembly 200 can fuse the image displayed on the display screen 107 of the top cover body 100 and the real scene behind the transflective assembly 200 together to achieve virtual display. FIG. 9 illustrates a schematic diagram of image-forming principle of a foldable display device consistent with the disclosed embodiments.

A shown in FIG. 9, light emitted from point A of an image displayed on the display screen 107 of the top cover body 100 passes through the transflective assembly 200 and enters into eyes 500 of a user. Because an angle exists between the display screen 107 and the transflective assembly 200, the user may view the image of point A at point B behind the transflective assembly 200. In addition, because the transflective assembly 200 is transparent, the real scene behind the transflective assembly 200 can also be seen by the user. Therefore, a display effect that the image and the real scene are fused together can be achieved.

As shown in FIG. 3, when the user wants to collapse the foldable display device, the user needs to first place the bracket 401 into the mounting groove. That is, the foldable display device returns to the open state (as shown in FIG. 2) from the viewing angle adjustable state (as shown in FIG. 3). Then, the user presses down the top part of the foldable display device until the foldable display device returns to the closed state (as shown in FIG. 1).

Figure 10:
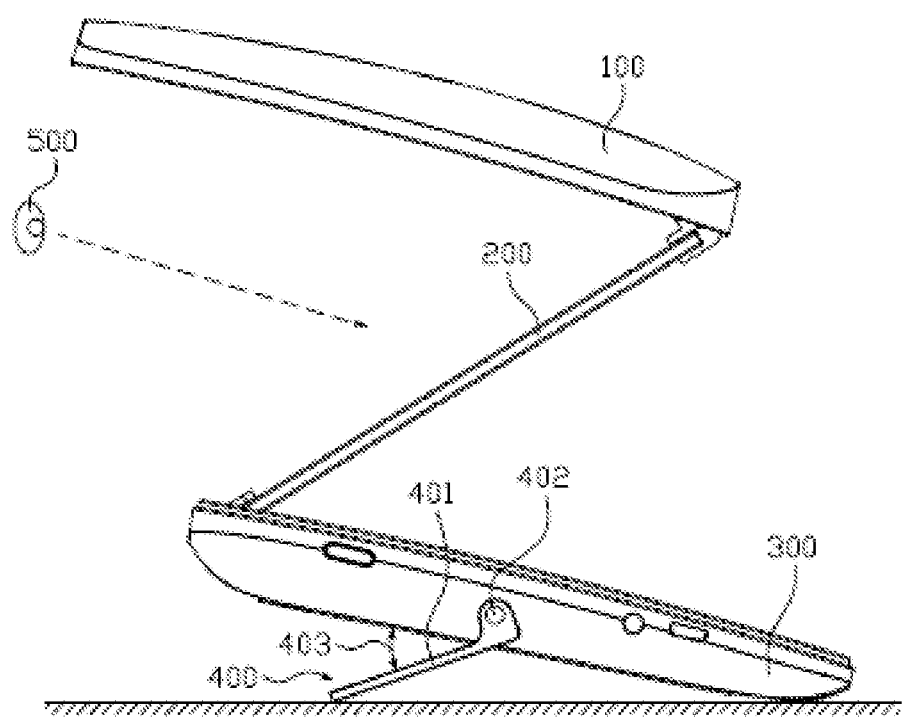
FIG. 10 illustrates a schematic diagram of another exemplary foldable display device in a viewing angle adjustable state consistent with the disclosed embodiments.

However, with the foldable display device shown in FIG. 3 is that, before the user collapses the foldable display device, the user may forget to place the bracket 401 into the mounting groove. At this time, if the user presses down the top of the foldable display device, there is a risk of causing the bracket 401 damage. A modified design may be provided as shown in FIG. 10. FIG. 10 illustrates a schematic diagram of another exemplary foldable display device in a viewing angle adjustable state consistent with the disclosed embodiments.

As shown in FIG. 10, the difference between the structure shown in FIG. 10 and the structure shown in FIG. 3 is that the rotating shaft 402 is a damping shaft in the embodiment shown in FIG. 10. When the viewing angle is adjusted, the expanding direction of the bracket 401 is opposite to the expanding direction of the bracket 401 shown in FIG. 3. The bracket 401 is opened from the front to the back. That is, the bracket 401 is rotated in a counterclockwise direction by using one end of the bracket 401 which is connected to the bottom cover body 300 as a fixed end and using the other end of the bracket 401 as an oscillating end. Or, the bracket 401 is opened from the front part of the bottom cover body 300, and the bracket 401 is rotated toward the back of the bottom cover body 300 using the rotating shaft 402 as the axis.

The operation for opening the angle 403 is stabilized through friction of the rotating shaft 402 (i.e., damping shaft). When the user wants to collapse the foldable display device, at the beginning, the user does not need to collapse the bracket 401. Instead, the user can directly press down the top of the foldable display device until the foldable display device is in the closed state (as shown in FIG. 1). The user does not need to manually control the viewing angle adjustment mechanism 400 to be back into an initial state. The operation is easy to perform and does not cause an erroneous operation. Therefore, the bracket 401 may not be damaged due to the erroneous operation.

Other structures of the foldable display device can refer to the above embodiments, details of which are not repeated herein.

Figure 11:
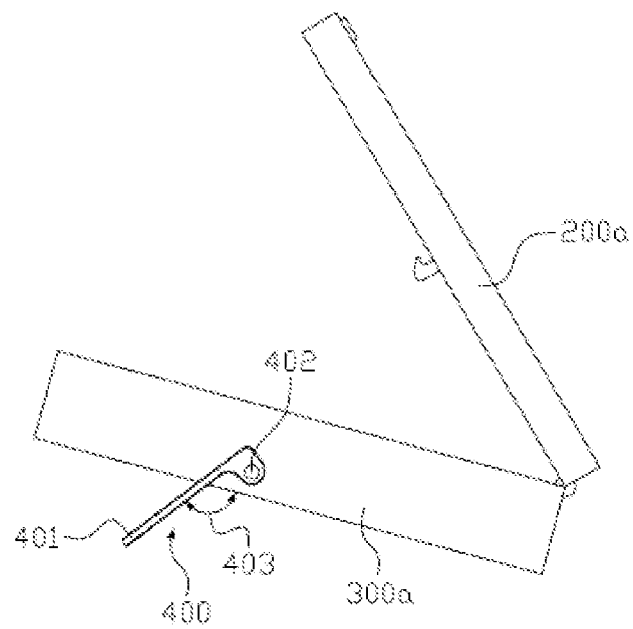
FIG. 11 illustrates a schematic diagram of another exemplary foldable display device in a viewing angle adjustable state consistent with the disclosed embodiments.

FIG. 11 illustrates a schematic diagram of another exemplary foldable display device in a viewing angle adjustable state consistent with the disclosed embodiments. Comparing to the structure shown in FIG. 3, the foldable display device shown in FIG. 11 may include the bottom cover body 300a, the transflective assembly 200a, and the viewing angle adjustment mechanism 400. However, the foldable display device does not include the top cover body 100. Therefore, the foldable display device appears to be a "<" shape when the foldable display device is opened. The display screen 107 is set on the bottom cover body 300a. The display screen may be configured to display image data received by the foldable display device. In addition, the image data displayed by the display screen 107, under transmission and reflection of the transflective assembly 200a, can form an image in the space for the user to view.

Because the foldable display device does not include the top cover body 100, the unlock switch 102 and the lock catch 103 are set on the transflective assembly 200a. That is, the transflective assembly 200a includes the transflective board 202, the unlock switch 102, and the lock catch 103. The bottom cover body 300a includes the bottom case 301, the bolt 303, and the display screen 107. The transflective assembly 200a is connected to the bottom cover body 300a through a movable connection structure (e.g., a torsion shaft). When the unlock switch 102 is pressed, the lock catch 103 and the bolt 303 are unlocked, and the foldable display device automatically pops up under the action of the movable connection structure.

Specifically, the expanding direction of the viewing angle adjustment mechanism 400 is described in the followings. The viewing angle adjustment mechanism 400 is rotated in a clockwise direction using one end of the bracket 401 which is connected to the bottom cover body 300a as the fixed end and using the other end of the bracket 401 as the oscillating end. That is, the bracket 401 is opened from the back of the bottom cover body 300a, and the bracket 401 is rotated to the front of the bottom cover body 300a using the rotating shaft 402 as the axis, such that the foldable display device and a support platform can form a relatively stable triangular relationship. Other structures can refer to the above embodiments, details of which are not repeated herein.

Figure 12:
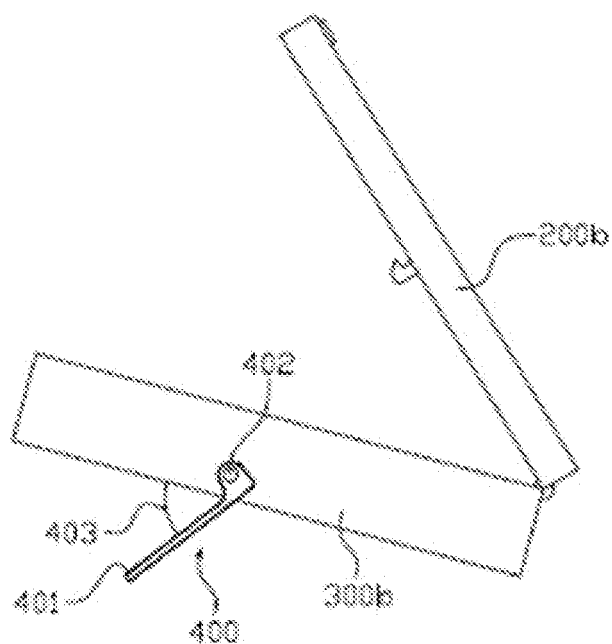
FIG. 12 illustrates a schematic diagram of another exemplary foldable display device in a viewing angle adjustable state consistent with the disclosed embodiments.

FIG. 12 illustrates a schematic diagram of another exemplary foldable display device in a viewing angle adjustable state consistent with the disclosed embodiments. Comparing to the embodiment shown in FIG. 10, the foldable display device may include the bottom cover body 300b, the transflective assembly 200b, and the viewing angle adjustment mechanism 400. However, the foldable display device does not include the top cover body 100. Therefore, the foldable display device appears to be a "<" shape when the foldable display device is opened. The display screen 107 is set on the bottom cover body 300b. The display screen may be configured to display image data received by the foldable display device. In addition, the image data displayed by the display screen 107, under transmission and reflection of the transflective assembly 200b, can form an image in the space for the user to view.

Because the foldable display device does not include the top cover body 100, the unlock switch 102 and the lock catch 103 are set on the transflective assembly 200b. That is, the transflective assembly 200b includes the transflective board 202, the unlock switch 102, and the lock catch 103. The bottom cover body 300b includes the bottom case 301, the bolt 303, and the display screen 107. The transflective assembly 200b is connected to the bottom cover body 300b through the movable connection structure (e.g., a torsion shaft). When the unlock switch 102 is pressed, the lock catch 103 and the bolt 303 are unlocked, and the foldable display device automatically pops up under the action of the movable connection structure.

Specifically, the expanding direction of the viewing angle adjustment mechanism 400 is described in the followings. The viewing angle adjustment mechanism 400 is rotated in a counterclockwise direction using one end of the bracket 401 which is connected to the bottom cover body 300b as the fixed end and using the other end of the bracket 401 as the oscillating end. That is, the bracket 401 is opened from the front of the bottom cover body 300b, and the bracket 401 is rotated to the back of the bottom cover body 300b using the rotating shaft 402 as the axis, such that the foldable display device is opened with an angle 403 through the rotating shaft 402. Other structures can refer to the above embodiments, details of which are not repeated herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A foldable display device, comprising: a top cover body; a transflective assembly rotatably connected to the top cover body; a bottom cover body rotatably connected to the transflective assembly; and a viewing angle adjustment mechanism set on the bottom cover body and configured to expand and collapse with respect to the bottom cover body, wherein: the top cover body, the transflective assembly, and the bottom cover body are configured to expand spatially to form a viewing angle when the foldable display device is in an open state; the viewing angle adjustment mechanism is configured to expand with respect to the bottom cover body to adjust the viewing angle when the foldable display device is in a viewing angle adjustable state and to support the foldable display device when the foldable display device is in the open state; wherein a display screen is set on one of the top cover body and the bottom cover body, wherein, when the foldable display device is in the open state, the top cover body, the transflective assembly, and the bottom cover body form a Z-shape; and wherein the transflective assembly further includes a transflective board, and the transflective assembly is connected respectively to the top cover body and the bottom cover body through a movable connection structure and is configured to facilitate the foldable display device to automatically pop up to the open state.

2. The device according to claim 1, wherein: the viewing angle adjustment mechanism includes a bracket and a rotating shaft; the bracket is rotatably connected to the bottom cover body through the rotating shaft; and when the viewing angle adjustment mechanism expands, the bracket is upturned from the back of the bottom cover body, and the bracket is rotated toward the front of the bottom cover body using the rotating shaft as an axis.

3. The device according to claim 1, wherein: the viewing angle adjustment mechanism further includes a bracket and a damping shaft; the bracket is rotatably connected to the bottom cover body through the damping shaft; and when the viewing angle adjustment mechanism expands, the bracket is upturned from the front of the bottom cover body, and the bracket is rotated toward the back of the bottom cover body using the damping shaft as an axis.

4. The device according to claim 3 wherein:
a mounting groove is set on the bottom of the bottom cover body; and
when the bracket is collapsed, the bracket is placed inside the mounting groove.

5. The device according to claim 1, wherein: the top cover body further includes a top case, an unlock switch, and a lock catch; the bottom cover body further includes a bottom case and a bolt; and when the unlock switch is pressed, the lock catch and the bolt are unlocked, and the foldable display device automatically pops up to the open state.

6. The device according to claim 5, wherein:
the unlock switch is a push-button; and
when the push-button is pushed, the lock catch is driven to move to unlock the lock catch and the bolt.

7. The device according to claim 5, wherein:
the lock catch includes a pressing lever, a pressing lever shaft, an unlock connecting rod, and a latch hook;
the unlock switch abuts the pressing lever;
the position of the pressing lever shaft is fixed;
the pressing lever is installed on the pressing lever shaft, and the pressing lever is rotated using the pressing lever shaft as an axis;
the pressing lever abuts the unlock connecting rod; and
the latch hook is formed on the unlock connecting rod.

8. A foldable display device, comprising: a top cover body; a bottom cover body; a transflective assembly rotatably connected to the top cover body and the bottom cover body; and a viewing angle adjustment mechanism set on the bottom cover body and configured to expand and collapse with respect to the bottom cover body, wherein: the transflective assembly and the bottom cover body are configured to expand spatially to form a viewing angle when the foldable display device is in an open state; and the viewing angle adjustment mechanism is configured to expand with respect to the bottom cover body to adjust the viewing angle when the foldable display device is in a viewing angle adjustable state and to support the foldable display device when the foldable display device is in the open state; wherein the transflective assembly can fuse an image displayed on a display screen of the top cover body and the real scene behind the transflective assembly together to achieve virtual display; and wherein the transflective assembly further includes a transflective board; and the transflective assembly is connected respectively to the bottom cover body through a movable connection structure and is configured to facilitate the foldable display device to automatically pop up to the open state.

9. The device according to claim 8, wherein:
when the foldable display device is in the open state, the transflective assembly and the bottom cover body form a "<" shape.

10. The device according to claim 8, wherein: the transflective assembly includes the transflective board, an unlock switch, and a lock catch; the bottom cover body includes a bottom case and a bolt; and when the unlock switch is pressed, the lock catch and the bolt are unlocked, and the foldable display device automatically pops up to the open state.

11. The device according to claim 10, wherein:
the unlock switch is a push-button; and
when the push-button is pushed, the lock catch is driven to move to unlock the lock catch and the bolt.

12. The device according to claim 10, wherein:
the lock catch includes a pressing lever, a pressing lever shaft, an unlock connecting rod, and a latch hook;
the unlock switch abuts the pressing lever;
the position of the pressing lever shaft is fixed;
the pressing lever is installed on the pressing lever shaft, and the pressing lever is rotated using the pressing lever shaft as an axis;
the pressing lever abuts the unlock connecting rod; and
the latch hook is formed on the unlock connecting rod.

13. The device according to claim 8, wherein: the viewing angle adjustment mechanism includes a bracket and a rotating shaft; the bracket is rotatably connected to the bottom cover body through the rotating shaft; and when the viewing angle adjustment mechanism expands, the bracket is upturned from the back of the bottom cover body, and the bracket is rotated toward the front of the bottom cover body using the rotating shaft as an axis.

14. The device according to claim 8, wherein:
the viewing angle adjustment mechanism further includes a bracket and a damping shaft;
the bracket is rotatably connected to the bottom cover body through the damping shaft; and
when the viewing angle adjustment mechanism expands, the bracket is upturned from the front of the bottom cover body, and the bracket is rotated toward the back of the bottom cover body using the damping shaft as the axis.

15. The device according to claim 14, wherein:
a mounting groove is set on the bottom of the bottom cover body; and
when the bracket is collapsed, the bracket is placed inside the mounting groove.

\* \* \* \* \*